(12) United States Patent
Kulkarni et al.

(10) Patent No.: US 10,059,529 B1
(45) Date of Patent: Aug. 28, 2018

(54) SUPPORT PAD, SYSTEM AND LEG ASSEMBLY

(71) Applicant: Regal Beloit America, Inc., Beloit, WI (US)

(72) Inventors: Chaitanya Kulkarni, Maharashtra (IN); Amogh Gokhale, Maharashtra (IN)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/652,649

(22) Filed: Jul. 18, 2017

(51) Int. Cl.
*B65G 41/00* (2006.01)
*F16M 5/00* (2006.01)

(52) U.S. Cl.
CPC .............. *B65G 41/00* (2013.01); *F16M 5/00* (2013.01)

(58) Field of Classification Search
CPC .................................. B65G 41/00; F16M 5/00
See application file for complete search history.

(56) References Cited

U.S. PATENT DOCUMENTS

| | | | | |
|---|---|---|---|---|
| 2,606,048 A * | 8/1952 | Jones | ........................ | B60R 1/06 403/145 |
| 2,753,586 A * | 7/1956 | Metz | ..................... | A47B 91/066 108/118 |
| 3,017,153 A * | 1/1962 | Johnson | ................... | F16B 12/32 248/188 |
| 3,208,707 A * | 9/1965 | Blumrich | ................ | B64C 25/32 244/108 |
| 3,335,989 A * | 8/1967 | Bachmann | ............. | F16M 11/08 248/158 |
| 3,540,569 A * | 11/1970 | Herington | ............... | B65G 15/44 198/550.11 |
| 3,575,369 A * | 4/1971 | Tetlow | .................... | F16M 13/04 248/158 |
| 4,576,357 A * | 3/1986 | Schrepfer | ................ | F16M 7/00 248/188.2 |
| 4,766,976 A * | 8/1988 | Wallick, Jr. | ................ | E06C 7/44 182/111 |
| 8,141,841 B2 * | 3/2012 | von Lillienskjold | ... | F16F 1/445 248/188.8 |

* cited by examiner

Primary Examiner — Anita M King
(74) Attorney, Agent, or Firm — John Wagley

(57) ABSTRACT

A support pad including a body and a washer for supporting a leg is provided. The body includes a bottom and an opposed top defining a top external surface. The body has a central portion defining a spherically shaped pocket formed in the top of the body. The central portion receives a spherically shaped end of the leg and defines a central axis of the body. The body also has a dome shaped intermediate portion extending radially outward from the central portion. The body further has an outer portion extending radially outward from the central portion. The bottom includes a support pad support surface. The dome shaped intermediate portion has a uniform wall thickness. The washer is positioned adjacent the top external surface of the body and has an inner surface defining a central opening in the washer.

9 Claims, 7 Drawing Sheets

SUPPORT PAD, SYSTEM AND LEG ASSEMBLY

BACKGROUND OF THE INVENTION

The field of the invention relates generally to systems for transporting goods in an industrial environment.

Systems are used to store, sort and transport goods in manufacturing facilities as well as in storage and distribution facilities, also known as warehouses. The systems advance goods in a combination of horizontal and vertical directions. When transferring in a generally horizontal direction, rollers and belts mounted to the systems may be used to move the goods.

The belts and roller may be positioned at a sitting or standing height for access to workers or pickers. The systems may be permanently or temporarily installed.

The systems may include tables or bases on which the rollers and/or belts are supported. The tables and bases may be supported by upright members or legs. The legs may include pads or supports at the lower ends of the legs. The pads or supports may be position on the floor of the facility and may be secured to the floor by anchors or fasteners to fixedly support the systems.

The legs and the pads are subject to heavy and varying loads as good are transported and sorted, often at high speeds, along the systems. As the layout of the manufacturing or warehouse facility may need to change, the system may need to change, due to changing order mix and volume and changes in manufacturing processes. Providing conveyor bases, legs and pads that can be easily disassembled, transported and reassembled can be advantageous to accommodate the need to change the systems.

It is desirable to provide a strong, economical system with strong, durable, economical components. It is also desirable to provide a conveyor system that may be easily and quickly installed and modified.

The present invention is directed to alleviate at least some of these problems with the prior art.

BRIEF DESCRIPTION OF THE INVENTION

According to an embodiment of the invention, a support pad for supporting a leg is provided. The leg includes a member or spindle and may include a column that may engage the spindle. The support pad includes a body and a washer.

The body includes a bottom and an opposed top defining a top external surface. The body has a central portion of the body. The central portion defines a spherically shaped pocket formed in the top of the body. The central portion receives a spherically shaped end of the leg and defines a central axis of the body. The body also has a dome shaped intermediate portion extending radially outward from the central portion. The body further has an outer portion extending radially outward from the central portion. The bottom includes a support pad support surface. The dome shaped intermediate portion has a uniform wall thickness.

The washer is positioned adjacent the top external surface of the body and has an inner surface defining a central opening in the washer. The inner surface of the washer contacts the spindle. The spindle has an external periphery in contact with the inner surface of the washer. The spindle and the washer are in contact with the spindle around the entire inner surface of the washer.

According to another embodiment of the invention, the support pad may be configured such that the dome shaped intermediate portion of the body is spherically shaped.

According to another embodiment of the invention, the support pad may be configured such that the dome shaped intermediate portion of the body further includes an interior surface that is smooth and has no interior supporting ribs.

According to another embodiment of the invention, the support pad may be configured such that the dome shaped intermediate portion of the body defines a plurality of transverse cylindrical openings extending perpendicularly from the support pad support surface of the body.

According to yet another embodiment of the invention, the support pad may be configured such that the transverse openings of the body are covered at the top of the body.

According to yet another embodiment of the invention, the support pad may be configured such that the central portion of the body defines a central portion wall thickness of the body. The central portion wall thickness may be uniform.

According to yet another embodiment of the invention, the support pad may be configured such that the central portion wall thickness is substantially the same as the dome shaped intermediate portion wall thickness.

According to yet another embodiment of the invention, the support pad may be configured such that the body includes a polymer.

According to yet another embodiment of the invention, the support pad may be configured such that the washer extends radially outwardly and radially downward towards the bottom of the body. The washer may cover the top external surface of the body.

According to yet another embodiment of the invention, the support pad may be configured such that the washer includes an elastomeric material.

According to yet another embodiment of the invention, the support pad may be configured such that the spherically shaped pocket of the body is shaped to permit the leg to pivot up to around 3 to 4 degrees from the central axis of the body.

According to yet another embodiment of the invention, a conveyor assembly is provided. The conveyor assembly includes a frame and a conveyor mounted to the frame.

The conveyor assembly also includes a plurality of legs extending downwardly from the frame. At least two of the legs have a spherically shaped end of the spindle.

The conveyor assembly also includes a plurality of support pads for supporting the plurality of legs. Each of the pads include a body defining a bottom having a bottom external surface and an opposed top having a top external surface of the body. The top external surface of the body has a central portion of the top external surface of the body. The central portion defines a spherically shaped pocket formed in the top of the body. The central portion receives the spherically shaped end of the spindle and defines a central axis of the body. The body also has a dome shaped intermediate portion extending radially outward from the central portion. The body further has an outer portion extending radially outward from the central portion. The bottom external surface includes a support pad support surface. The dome shaped intermediate portion defines a portion of the bottom external surface. The portion of the bottom external surface defined by the intermediate central portion defines a continuously curving concave surface;

The conveyor assembly also includes a washer positioned adjacent the top external surface of the body and having an inner peripherical surface defining a central opening in the washer. The inner peripherical surface of the washer is in contact with the spindle and the spindle has an external surface in contact with the inner peripherical surface of the washer. Preferably, the spindle is in contact with the washer around the entire inner peripherical surface of the washer.

According to yet another embodiment of the invention, the conveyor assembly may be configured such that the dome shaped intermediate portion is spherically shaped.

According to yet another embodiment of the invention, the conveyor assembly may be configured such that the central portion defines a central portion wall thickness of the central portion. The dome shaped intermediate portion defines a dome shaped intermediate portion wall thickness of the dome shaped intermediate portion. The central portion wall thickness is uniform and the dome shaped intermediate portion wall thickness is uniform.

According to yet another embodiment of the invention, the conveyor assembly may be configured such that the central portion wall thickness is substantially the same as the dome shaped intermediate portion wall thickness.

According to yet another embodiment of the invention, the conveyor assembly may be configured such that the washer comprises an elastomer.

According to yet another embodiment of the invention, a conveyor leg for supporting a conveyor is provided. The conveyor leg may include a vertically extending member in the form of, for example, a spindle, having a distal end having a generally spherical shape and a base.

The base defines a bottom and an opposed top having a top external surface. The base has a central portion of the base. The central portion defines a pocket formed in the top of the base for receiving a distal end of the vertically extending member. The base defines a central axis of the base, the base also has an intermediate portion extending radially outwardly from the central portion. The base further has an outer portion extending radially outwardly from the intermediate portion. The outer portion includes a support pad support surface. The intermediate portion defines an intermediate portion bottom external surface positioned axially toward the bottom. The intermediate portion bottom external surface defines a continuously curving concave surface.

The conveyor leg also includes a washer positioned adjacent the top external surface of the base. The washer has an inner surface defining a central opening in the washer. The inner surface is in contact with the vertically extending member and the vertically extending member has an external periphery in contact with the inner surface of the washer. The washer extends radially outwardly and axially downwardly towards the bottom of the base. The washer covers the top external surface of the base.

According to yet another embodiment of the invention, the spindle of the conveyor leg may be configured such that the distal portion of the spindle is spherically shaped.

According to yet another embodiment of the invention, the conveyor leg may be configured such that the central portion defines a central portion wall thickness of the central portion and the intermediate portion defines an intermediate portion wall thickness of the intermediate portion. The central portion wall thickness is uniform and the intermediate portion wall thickness is uniform.

According to yet another embodiment of the invention, the conveyor leg may be configured such that the central portion wall thickness is substantially the same as the intermediate portion wall thickness.

According to yet another embodiment of the invention, the conveyor leg may be configured such that the washer comprises an elastomer.

DETAILED DESCRIPTION OF THE INVENTION

The method, systems and apparatus described herein provide for a conveyor system, a conveyor leg with a spindle and a conveyor pad with reduced cost and improved functionality.

Figure 1:
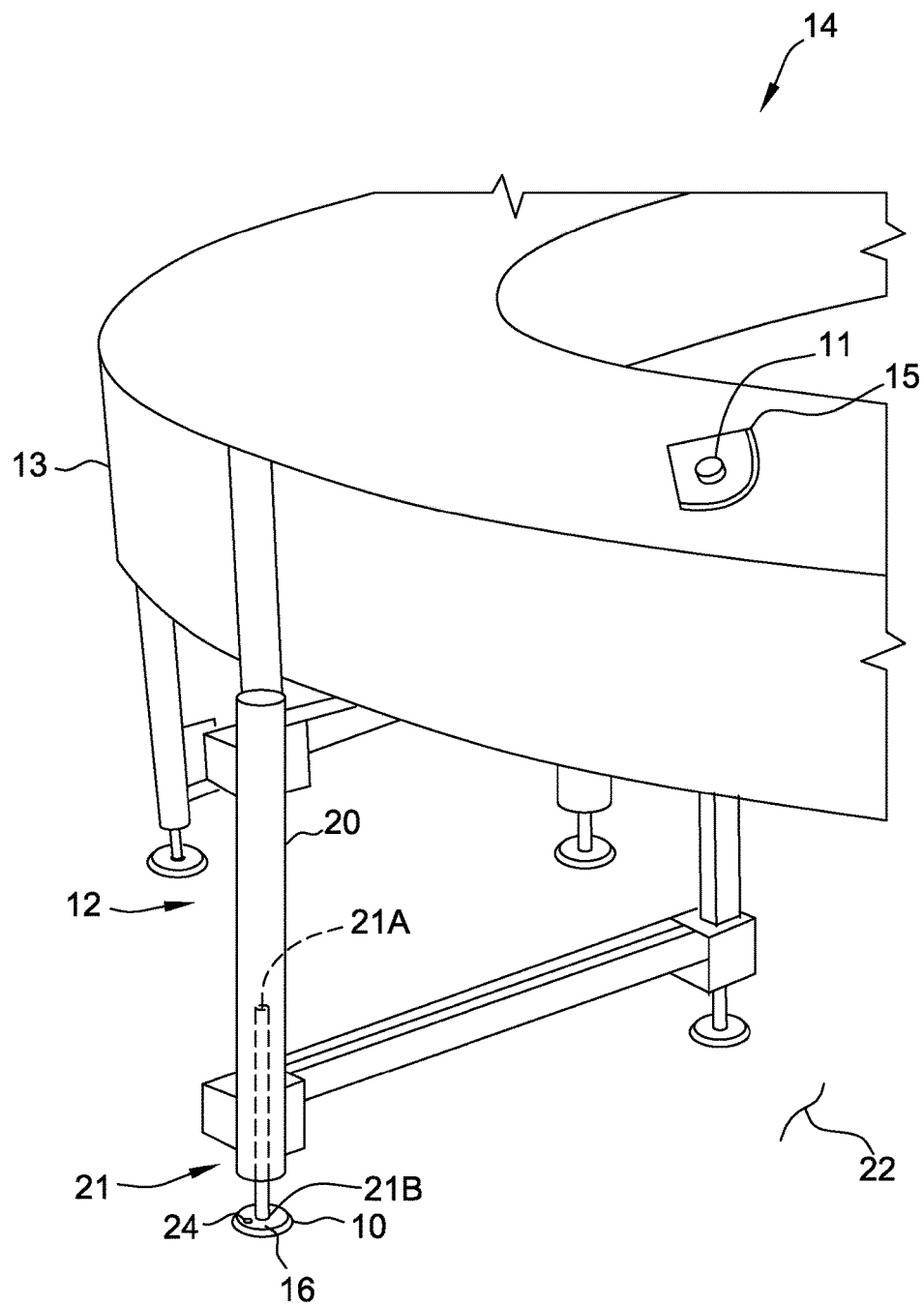
FIG. 1 is a perspective view of a conveyor system including a conveyor, a leg having a spindle and a pad, according to an embodiment of the present invention.

As shown in FIG. 1, and according to an embodiment of the invention, a support pad 10 for supporting a leg 12 for a conveyor 13 of a conveyor system 14 is provided.

The conveyor 13 of the conveyor systems 14 is used to store and transport goods 11 in manufacturing facilities as well as in storage and distribution facilities, also known as warehouses. The conveyors advance goods in a combination of horizontal and vertical directions. When transferring in an at least partially horizontal direction, rollers (not shown) and or belts 15 mounted to the conveyor 13 may be used to move the goods.

The belts 15 may be positioned at a sitting or standing height for access to workers or pickers. The conveyors may be permanently or temporarily installed. The conveyors may include tables or bases 16 on which the belts 15 are supported. The bases 16 may be supported by upright members or legs 12. The legs may include pads 10 or supports at the lower ends of the legs 12. The pads or supports may be position on floor 22 of the facility and may be secured to the floor 22 by anchors or fasteners 24 to fixedly support the conveyor 13.

While the pads 10 may be directly secured to the lower ends of the legs, to provide for height adjustment, spindles 21, in the form of, for example, externally threaded shafts may be threadedly connected to internally threaded columns 20 of the legs 12 on a first end 21A of the spindle 21 and pivotably connected to the pads 10 at a second end 21B of the spindle 21, opposed to the first end 21A.

Figure 2:
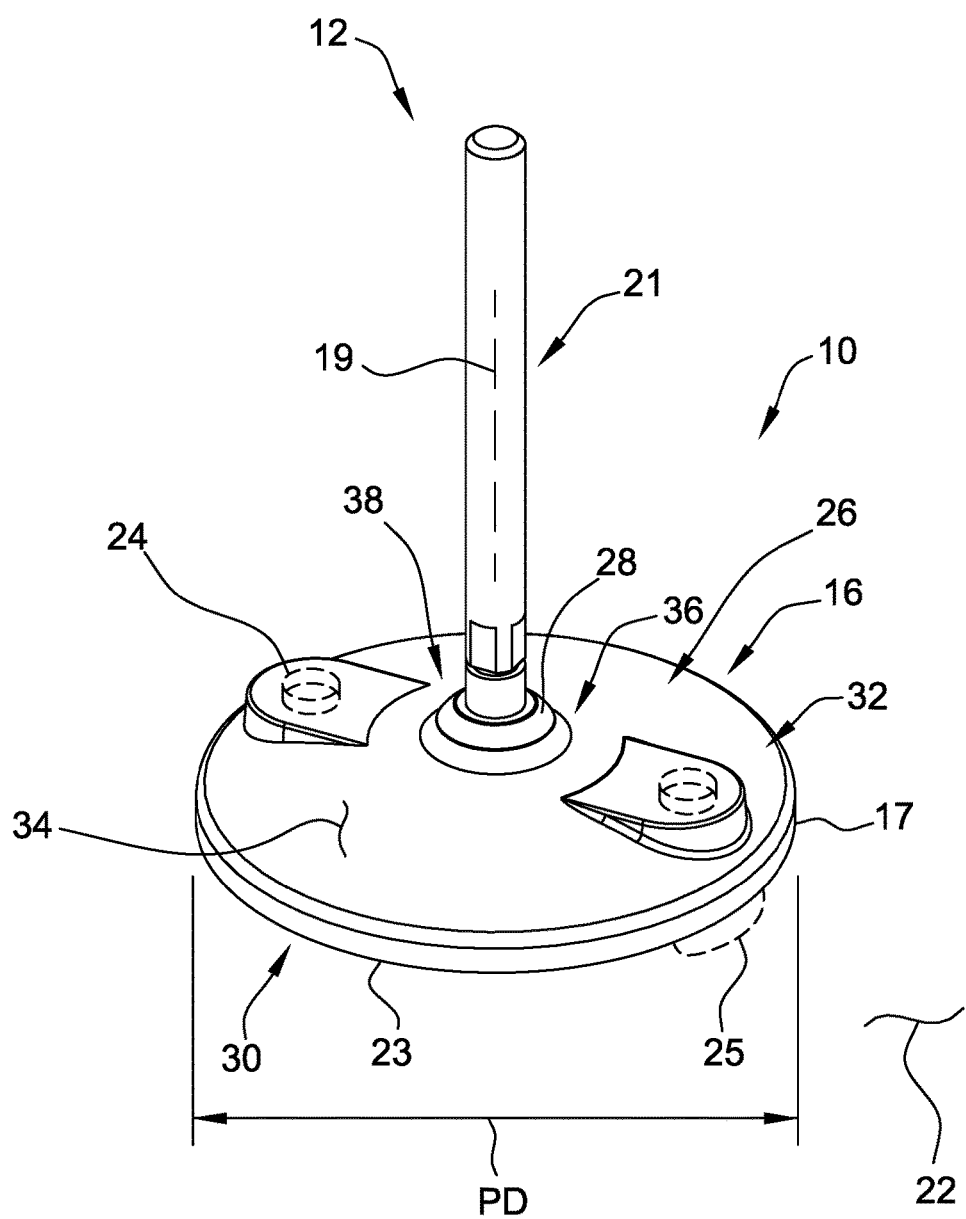
FIG. 2 is a perspective view of the pad assembly of conveyor system of FIG. 1 including a pad, height adjustment screw and a sealing washer.

Referring now to FIG. 2, the support pad 10 may include a body 26 and a member, for example, washer 28.

The body 26 is constructed of materials and of a shape capable of supporting the weight of the leg 12 and the portion of the conveyor system 14 that the leg 12 supports. The body 26 may be machined, cast or molded or manufactured using any suitable method or methods. For example, the body 26 may be made of a metal, a polymer or a composite The support pad 10 is used to support and bear the weight of the conveyor 13. The support pad may also serve to stabilize the conveyor 13. To support and stabilize the conveyor 13, the pad 10 may have a radially extending periphery 17 extending transversely from longitudinal axis 19 of the leg 12 and its spindle 21. The periphery 17 of the pad 10 may have any suitable configuration and may have a geometric or non-geometric shape. For example, the periphery 17 may be square, rectangular, polygon, star shape or irregular shape. For simplicity and to obtain optimum support and stabilization at low cost, the periphery 17 may be circular or cylindrical, as shown in FIG. 2.

The periphery 17 of the pad 10 may define a diameter PD that may be selected depending on the needs and constraints of the conveyor system. It should be appreciated that pads 10 may be provided with different diameters PD with similar or identical other features and dimensions.

The pad may further include any suitable provision to secure the pad 10 to the floor 22. For example, the pad 10 may include surface roughness or protrusions (not shown) on its lower or floor support surface 23. Alternatively, an anti-slip rubber layer 25 may be secured to the lower surface 23 of the pad 10.

Figure 3:
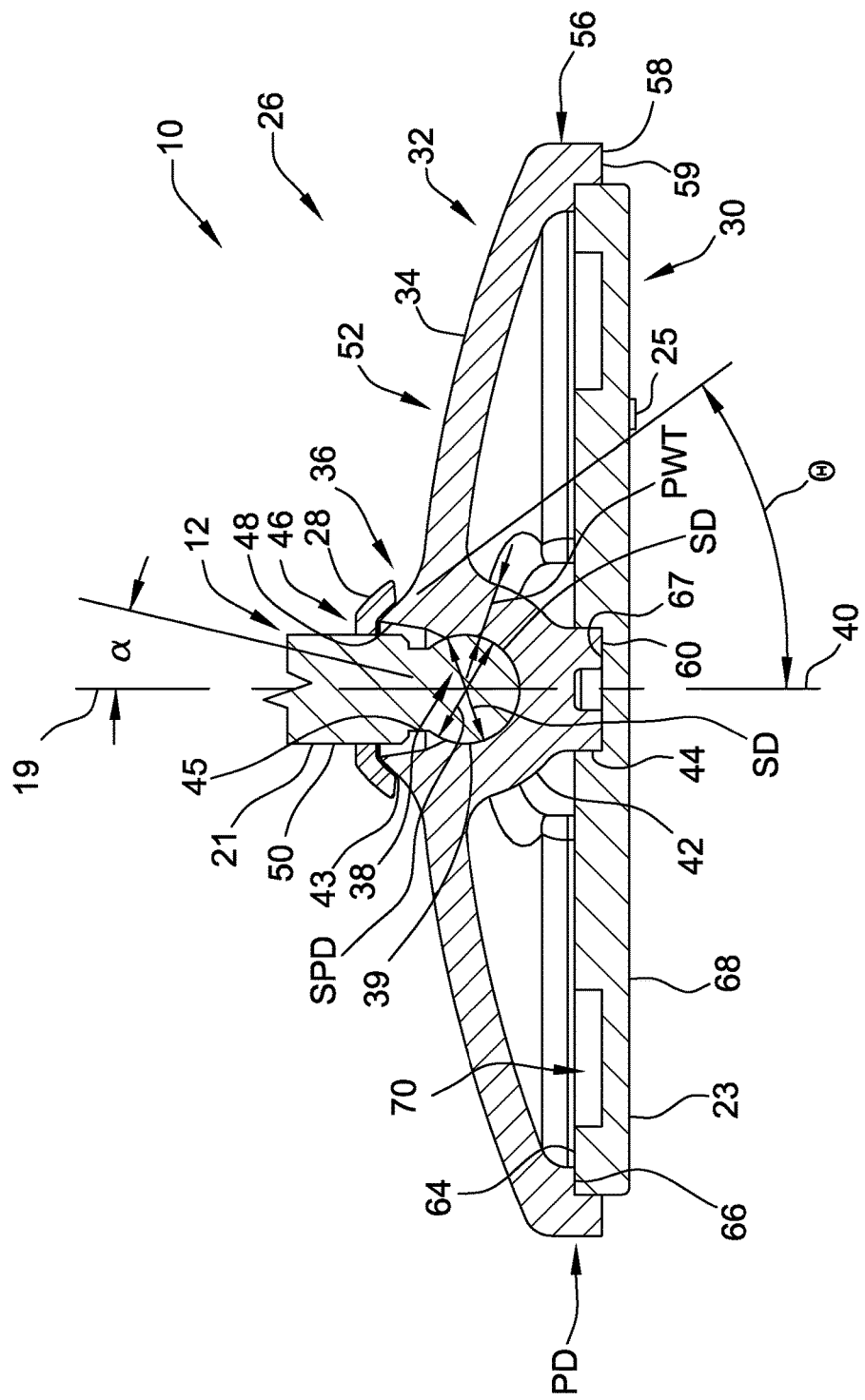
FIG. 3 is a partial cross sectional view of the pad assembly of FIG. 2.

The body 26, as shown in FIG. 2 and FIG. 3, includes a bottom 30 and an opposed top 32 defining a top external surface 34. It should be appreciated that the top 32 and the bottom 30 of the body 26 may be integral with each other or, as shown, the bottom 30 and the top 32 may be separable components that may be combined to form the body 26.

The body 26, as shown may have a central portion 36 of the body 26. The central portion 36 may define a spherically shaped pocket 38 formed in the top 32 of the body 26. The spherically shaped pocket 38 of the central portion 36 may receive a spherically shaped end 39 of the spindle 21 and may be located along a central axis 40 of the body 26. The spherically shaped end 39 may be defined by a spherical diameter SD.

It should be appreciated that a series of different size pads may be provided with various sizes of pads. The pads may have any peripheral shape and for simplicity may be round or cylindrical. The pads may be defined by diameters PD. The pads may have diameters PD that have any reasonable dimension and the pads may each have different diameters, the same diameter or a combination of both.

Some or all of the spherically shaped pockets 39 of the different size pads may have identical spherical pocket diameters SPD so that the different size pads may be interchangeable with a common spindle of a common leg and mate with end 39 of the common spindle 21.

The central portion 36 of the body 26 may have any suitable shape. The central portion 36 is configured to support the conveyor 13 through the leg 12. The central portion 36 preferably extends solidly from the pocket 38 to the lower surface 23 of the pad 10. The central portion may include a pocket support area 42 around the pocket 38. The pocket support area 42 may have a hollow spherical shape defined by a uniform wall thickness PWT and spherical pocket diameter SPD. Note that the spherical pocket diameter SPD of the pocket 38 preferably is sized to mate with the end 39 of the spindle 21. The pocket 38 may include a lip 45 that may resiliently receive the end 39 of the spindle 21. The central portion may be further defined by a protrusion in the shape of, for example, a cylindrical column 44 extending from the pocket support area 42 to the bottom 30 of the pad 10.

As shown in FIG. 3, the spherically shaped pocket 38 of the body 26 may, as shown, mate with the spherically shaped end 39 of the spindle 21 to permit the body 26 to swivel with respect to the leg, so that the body 26 may engage the floor 22 firmly and solidly to improve the rigidity of the installation and to minimize the loads and stresses on the body 26 and on the leg 12 including the spindle 21. The body 26 may further define a tapered opening 46 above the pocket 38. The tapered opening 46 may define the central axis 40 of the body 26. Note that the central axis 40 of the body may be coincident with the longitudinal axis 19 of the body when the leg 12 is positioned vertically. The tapered opening 46 may, as shown, be centrally positioned in the body. IT should be appreciated that the tapered opening 46 may be offset from the center of the pad diameter PD.

A wall 48 of the body 26 forming the tapered opening 46 may engage outer cylindrical periphery 50 of the spindle 21 to limit angular movement a of the leg 12 about the longitudinal axis 19 of the leg 12. The body 26 adjacent the tapered opening 46 may have an exterior surface 43 defining an angle θ with the longitudinal axis 19 of the leg 12.

As shown in FIG. 3, the support pad 10 may be configured such that the spherically shaped pocket 38 of the body 26 is shaped to permit the leg 12 to pivot up an angle α to around 1 to 15 degrees from the central axis 40 of the body 26, up to around 2 to 10 degrees from the central axis 40 of the body 26, up to around 3 to 7 degrees, or up to around 1 to 4 degrees from the central axis 40 of the body 26. It should be appreciated that the permitted pivot may be a design consideration, based in part on considerations such as the need to provide rigid support, the desire to avoid bending stress on the spindles, and to provide alignment of fasteners already in the floor.

Figure 4:
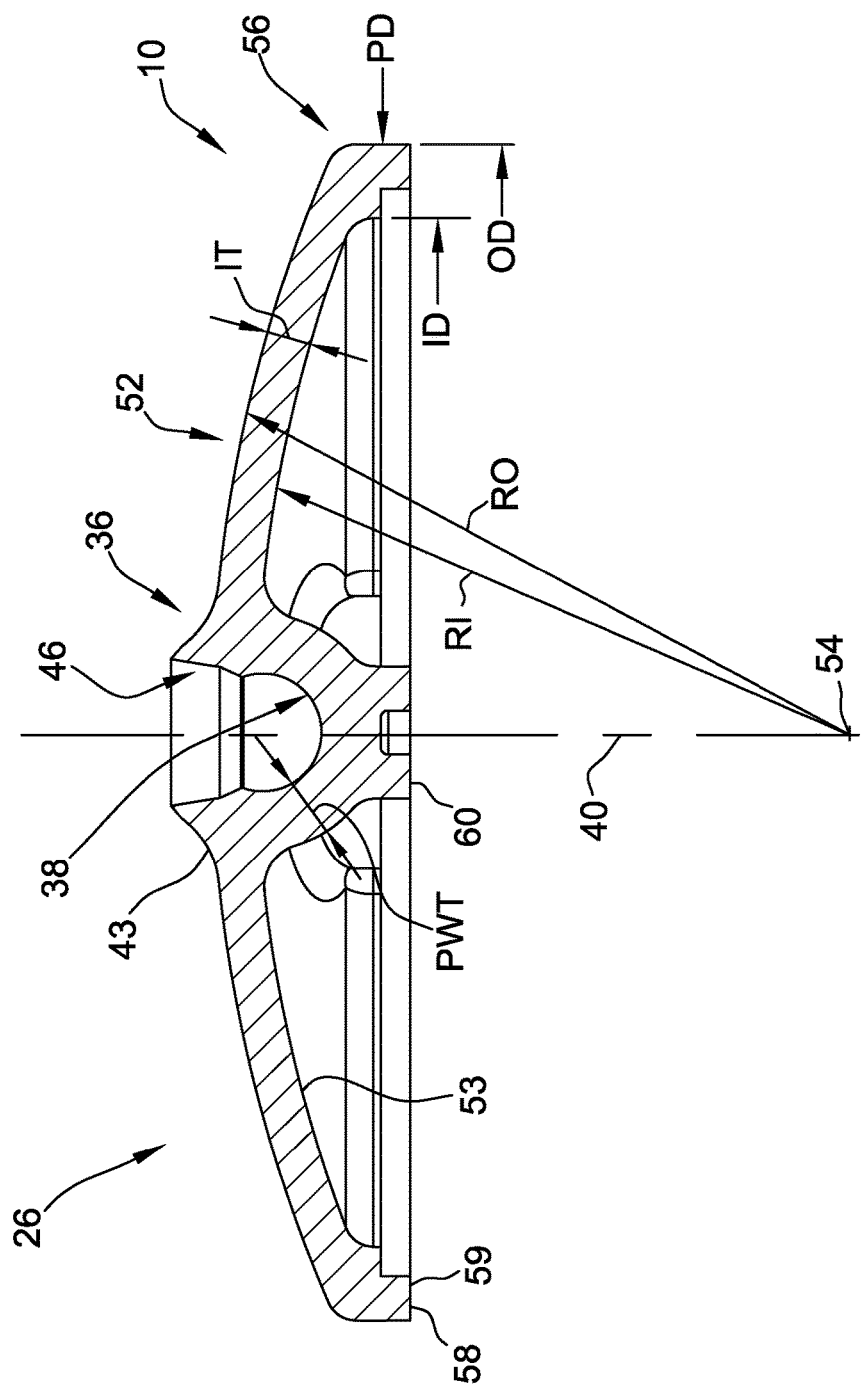
FIG. 4 is a partial cross sectional view of the pad of the pad assembly of FIG. 2 at a position spaced from the fastener bosses.

Referring now to FIG. 4, the body 26 may also have an intermediate or upper peripheral portion 52 extending radially outward from the central portion 36. While the intermediate portion 52 may any suitable shape, as shown in FIG. 3, the intermediate portion 52 is dome shaped. The dome shape may be defined by inner radius RI and outer radius RO extending from origin 54 that may be positioned coincident with central axis 40 of body 26. Inner radius RI and outer radius RO may define an intermediate portion thickness IT. A uniform intermediate portion thickness IT may provide optimum strength at lowest cost.

It should be appreciated that the uniform wall thickness PWT of the pocket support area 42 may be similar or identical to the intermediate portion thickness IT.

Continuing to refer to FIG. 4, the body 26, particularly lower or interior surface 53 of the intermediate or upper peripheral portion 52 may have a simple domed shape as shown. While the interior surface 53 may be defined by inner radius RI, the shape of the intermediate or upper peripheral portion 52 need not be a portion of a hollow sphere, but may have any suitable shape and may, for example, be any concave shape and may include the interior surface 53 having a shape that is continuously curving. The interior surface 53 may be concave and may be void of abrupt steps and void of any protrusions, including any ribs.

Preferably the interior surface 53 of the upper peripheral portion 52 does not include any support ribs (not shown). Support ribs extending inwardly from the interior surface 53 of the intermediate or upper peripheral portion 52 may appear to strengthen the pad, but the interior surface 53 has been found to have minimum load and stress. The load on the spindle 21 is found to transfer through central portion 36 of the body 26, i.e. from spherically shaped end 39 of the spindle 21 to floor 22. Dominating compressive stresses in the body 26 are located below the pocket 38 and in the central portion 36 of the body 26 extended below the pocket 38. Also, it has been found that ribs carry very little load and have very negligible tensile stresses on them.

Continuing to refer to FIG. 4, the body 26 may further have an outer portion 56 extending radially downwardly from the intermediate or upper peripheral portion 52. The outer portion 56 may be generally a hollow cylinder defined by outer diameter OD and inner diameter ID. Note that the outer diameter OD may be coincident with the pad diameter PD.

Figure 7:
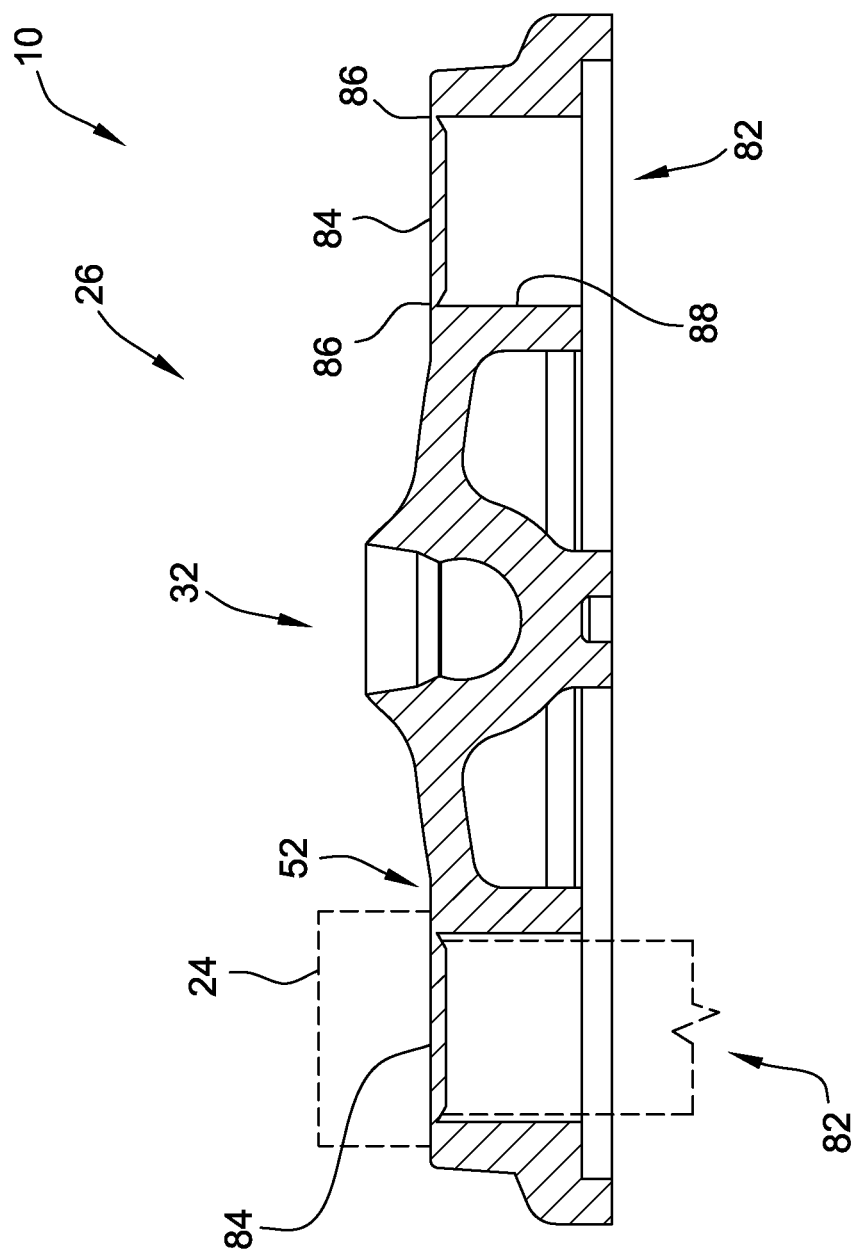
FIG. 7 is a partial cross sectional view of the pad of the pad assembly of FIG. 2 at a position along the fastener bosses.

As shown in FIGS. 4 and 7, the body 26 may be configured such that the body 26 is open when viewed from lower surface 58 of the body 26. As shown in FIG. 4, lower surface 58 is formed by an outer portion surface 59 formed by outer portion 56 and by a central portion surface 60 formed by central portion 36.

Alternatively and referring again to FIG. 3, the body 26 may further include the bottom 30. The bottom 30 includes the lower surface 23 of pad 10. The bottom 30 may be integral with the body 26 or may be a separate component. As shown in FIG. 3, the bottom 30 is made from a separate component. A separate body 26 and a separate bottom 30 may be easier to fabricate, particularly if molded or cast.

The bottom 30 includes an upper face 64 for mating with recessed face 66 of the body 26. The bottom 30 may also include an upper recessed face 67 for mating with central portion surface 60 of the body 26. The bottom 30 may be secured to the body 26 in any suitable fashion such as by interference fit, by adhesive or by fasteners (not shown).

The bottom 30 also includes a lower face 68 for mating with floor 22. It should be appreciated that elastomer or rubber layer 25 may be secured to lower face 68 of bottom 30. Alternatively, the bottom may be made of an elastomer, for example, a rubber. The bottom 30 may include recessed areas 70 in low load areas to reduce weight and cost.

It should be appreciated that the spherically shaped pocket 38 and the tapered opening 46 of pad 10 may collect fluids and/or debris since the pocket 38 is positioned on the top exterior surface 34 of the pad 10. Preferably and as shown in FIGS. 2 and 3, the support pad 10 may further include a plug or cover in, for example, the form of washer or seal 28 to limit the egress of fluids and/or debris into the tapered opening 46. The washer 28 may have any suitable shape to cover the tapered opening 46 between the spindle 21 and the pad 10.

Figure 5:
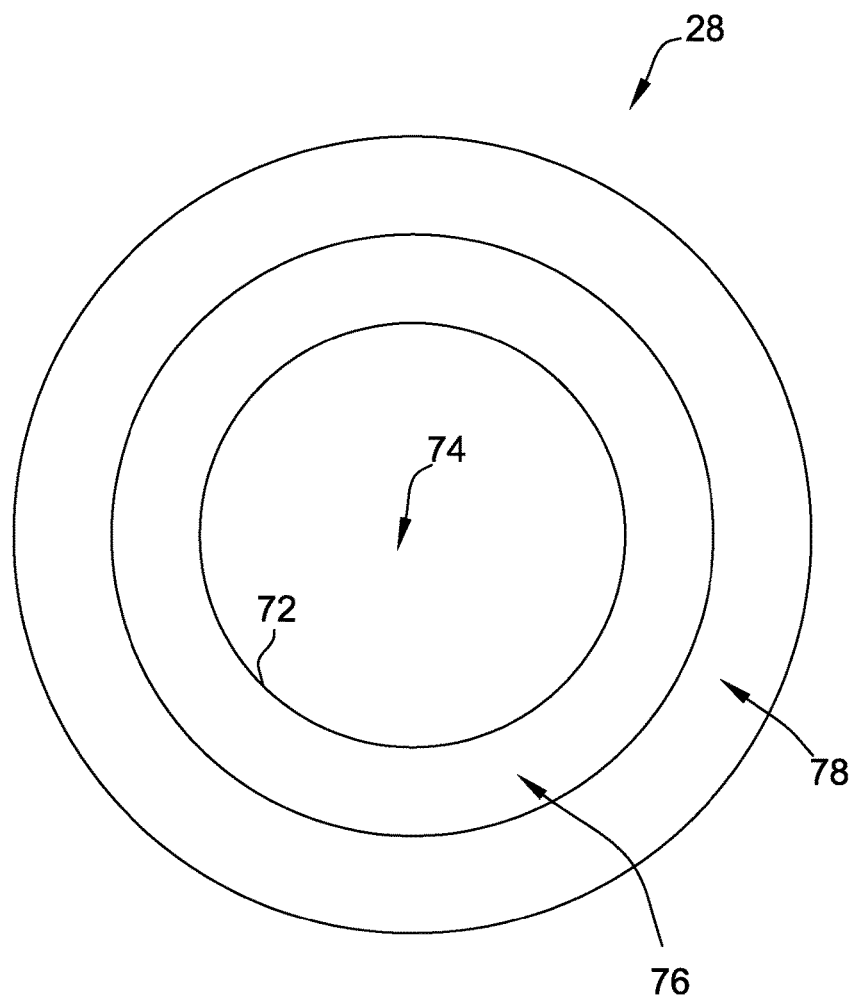
FIG. 5 is a plan view of the washer of the pad assembly of FIG. 2.
Figure 6:
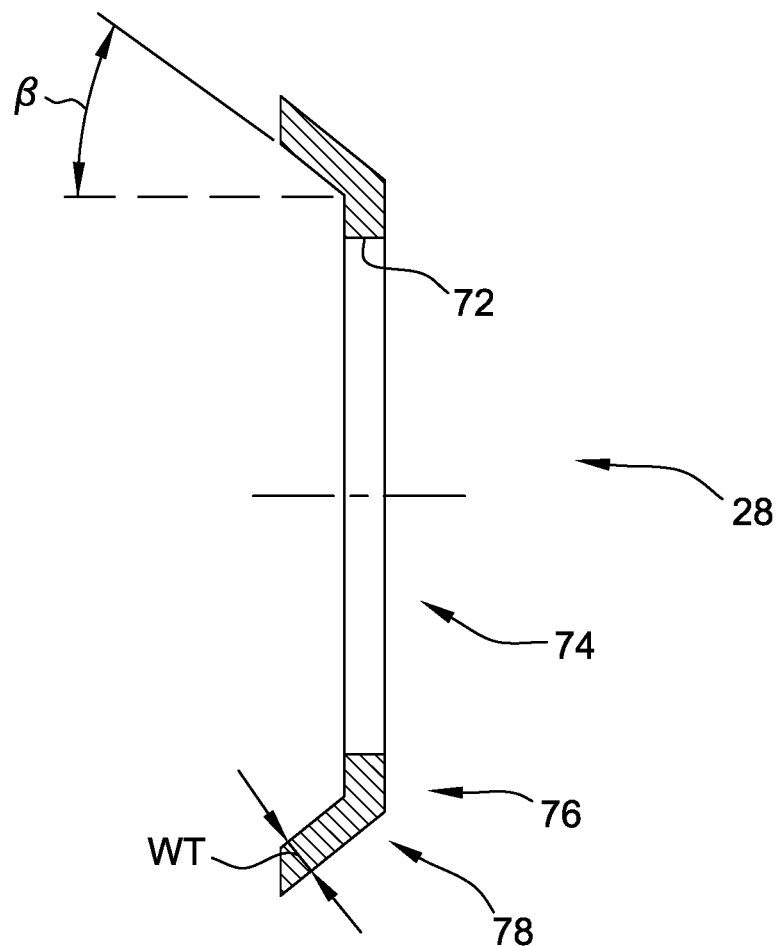
FIG. 6 is a cross sectional view of the washer of FIG. 5.

For example and as shown in FIGS. 3, 5 and 6, the washer 28 may be positioned on top exterior surface 43 of the body 26 adjacent the tapered opening 46. The washer 28 has an inner surface or periphery 72 defining a central opening 74 in the washer 28. The inner surface 72 of the washer 28 contacts the outer cylindrical periphery 50 of spindle 21. As shown in FIG. 3, the spindle 21 and the washer 28 preferably are in contact with each other around the entire inner surface 72 of the washer 28. The leg 12 or its spindle 21 and the washer 28 may be in nominal or in interference contact with each other.

For example and as shown in FIG. 3, the support pad 10 may be configured such that the washer 28 extends radially outwardly past the tapered opening 46. Further the support pad 10 may be configured such that the washer 28 extends radially downward towards the top exterior surface 43 of the body 26 of the pad 10. The washer 28 may cover the top exterior surface 43 of the body 26.

Referring again to FIGS. 5 and 6, the washer 28 for simplicity may be generally disk shaped and have the centrally located central opening 74. The washer 28 may have a hollow cylindrical center portion 76 and a tapered lip portion 78 extending outwardly and downwardly at an angle β from the cylindrical center portion 76. The washer may have a uniform thickness WT. The washer 28 may be made from any suitable durable material. For example, the washer 28 may be made of a metal, a polymer or a composite. For example, the washer 28 may be made of an elastomeric material, for example a rubber. The angle β of the washer may be the same as the angle θ of the exterior surface 43 of the central portion 36 of the body 26

While the support pads of the conveyor system 14 may support legs 12, including the spindle 21 that rest unanchored to the floor 22, in application with minimum vibration and in applications where the conveyor systems 14 are frequently rearranged, preferably and referring now to FIGS. 2 and 7, the body 26 of the support pad 10 may be fixedly secured to the floor 22. Such attachment to the floor 22 may be accomplished by adhesives or by fasteners 24. Such fasteners secure the pads 10 to floor 22.

As shown in FIGS. 2 and 7, the support pad 10 may be configured such that the intermediate portion 52 of the body 26 defines a plurality of transverse cylindrical openings 82 extending perpendicularly from the support pad support surface 23 of the pad 10.

As shown in FIGS. 2 and 7, to provide the flexibility to use a common pad 10 whether the pad is secured to the floor with or without fasteners 24, the support pad 10 may be configured such that the transverse openings 82 of the body 26 are covered at the top external surface 34 of the body 26.

As shown in FIG. 7 the portion of the body 26 above openings 82 include a cylindrical cover 84. A thinned area 86 is provided around the cover 84 to provide for easy removal of the cover 84 if fasteners 24 are used. The body 26 may, as shown in FIG. 7, include cylindrical supports 88 around the openings 82 to support the fasteners 24.

Technical effects of the methods, systems, and apparatus described herein include at least one of reduced cost, a larger variety of product options, improved performance and quality and reduced labor costs.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a conveyor leg and support pad that uses a more cost efficient, stronger and more durable design that may utilize lower cost materials and protect internal components from oxidation, wear and contamination. Furthermore, the exemplary methods system and apparatus achieve increased efficiency while reducing or eliminating changeover times in altering conveyor configurations. The methods, system and apparatus described herein may be used in any suitable application. However, they are particularly suited for conveyor applications.

Exemplary embodiments of the conveyor support pads and legs and associated systems are described above in detail. The conveyor support pads and legs and their components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A support pad for supporting a member, comprising:
  a body defining a bottom and an opposed top having a top external surface, said body having a central portion thereof, the central portion defining a spherically shaped pocket formed in the top of said body and for receiving a spherically shaped end of the member and defining a central axis of said body, said body also having a dome shaped intermediate portion extending radially outward from the central portion, and said body further having an outer portion extending radially outward from the central portion, the bottom including a support pad support surface, the dome shaped intermediate portion having a uniform wall thickness; and
  a washer positioned adjacent the top external surface of said body and having an inner surface defining a central opening in said washer, the inner surface in contact with the member and the member having an external periphery in contact with the inner surface of said washer, the member and said washer in contact with the member around the entire inner surface of said washer, wherein the dome shaped intermediate portion of said body defines a plurality of transverse cylindrical openings extending perpendicularly from the support pad support surface of said body.

2. The support pad in accordance with claim 1, wherein the transverse openings of said body are covered at the top of said body.

3. The support pad in accordance with claim 1, wherein the spherically shaped pocket of said body is shaped to permit the leg to pivot up to around 3 to 4 degrees from the central axis of said body.

4. A support pad for supporting a member, comprising:
  a body defining a bottom and an opposed top having a top external surface, said body having a central portion thereof, the central portion defining a spherically shaped pocket formed in the top of said body and for receiving a spherically shaped end of the member and defining a central axis of said body, said body also having a dome shaped intermediate portion extending radially outward from the central portion, and said body further having an outer portion extending radially outward from the central portion, the bottom including a support pad support surface, the dome shaped intermediate portion having a uniform wall thickness; and
  a washer positioned adjacent the top external surface of said body and having an inner surface defining a central opening in said washer, the inner surface in contact with the member and the member having an external periphery in contact with the inner surface of said washer, the member and said washer in contact with the member around the entire inner surface of said washer, wherein said washer extends radially outwardly and radially towards the bottom of said body, covering the top external surface of said body.

5. A leg assembly for supporting a conveyor, said leg assembly comprising:
  a vertically extending member having a distal end having a generally spherical shape;
  a base defining a bottom and an opposed top having a top external surface, said base having a central portion thereof, the central portion defining a pocket formed in the top of said base for receiving a distal end of said vertically extending member and defining a central axis of said base, said base also having an intermediate portion extending radially outwardly from the central portion, said base further having an outer portion extending radially outwardly from the intermediate portion, the outer portion including a support pad support surface, the intermediate portion defining an intermediate portion bottom external surface positioned axially toward the bottom, the intermediate portion bottom external surface defining a continuously curving concave surface; and
  a washer positioned adjacent the top external surface of said base and having an inner surface defining a central opening in said washer, the inner surface in contact with said vertically extending member and said vertically extending member having an external periphery in contact with the inner surface of said washer, said washer extending radially outwardly and axially towards the bottom of said base, covering the top external surface of said base.

6. The leg assembly in accordance with claim 5, wherein the intermediate portion is spherically shaped.

7. The leg assembly in accordance with claim 5, wherein the central portion defines a central portion wall thickness thereof and the intermediate portion defines an intermediate portion wall thickness thereof, the central portion wall thickness being uniform and the intermediate portion wall thickness being uniform.

8. The leg assembly in accordance with claim 7, wherein the central portion wall thickness is substantially the same as the intermediate portion wall thickness.

9. The leg assembly in accordance with claim 5, wherein said washer is in contact with said vertically extending member around the entire inner surface of said washer.

* * * * *